Oct. 17, 1944.　　　　　E. P. KINNE　　　　　2,360,566
DRAFT GEAR
Filed Sept. 15, 1941　　　3 Sheets-Sheet 1

INVENTOR.
Edmund P. Kinne
BY
Atty.

Oct. 17, 1944.  E. P. KINNE  2,360,566
DRAFT GEAR
Filed Sept. 15, 1941  3 Sheets-Sheet 2
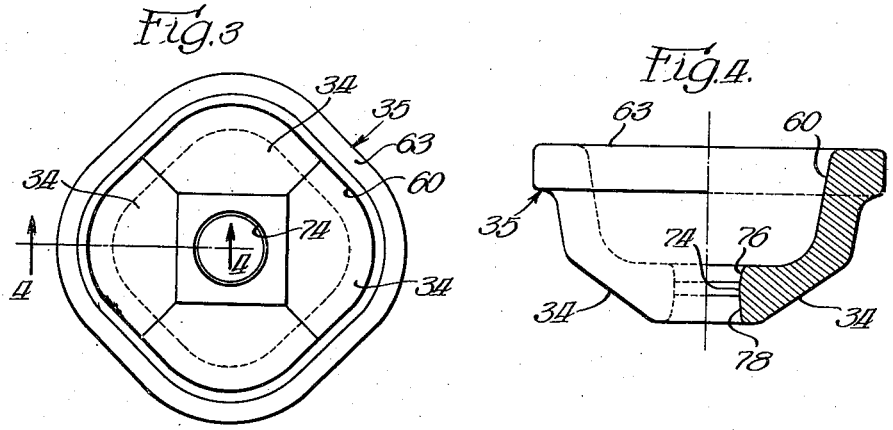
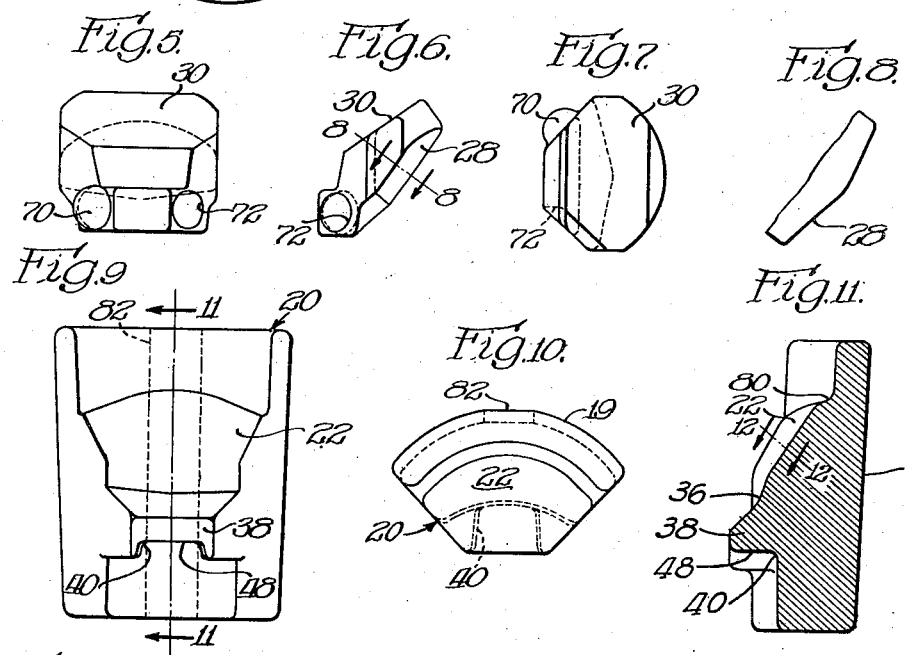
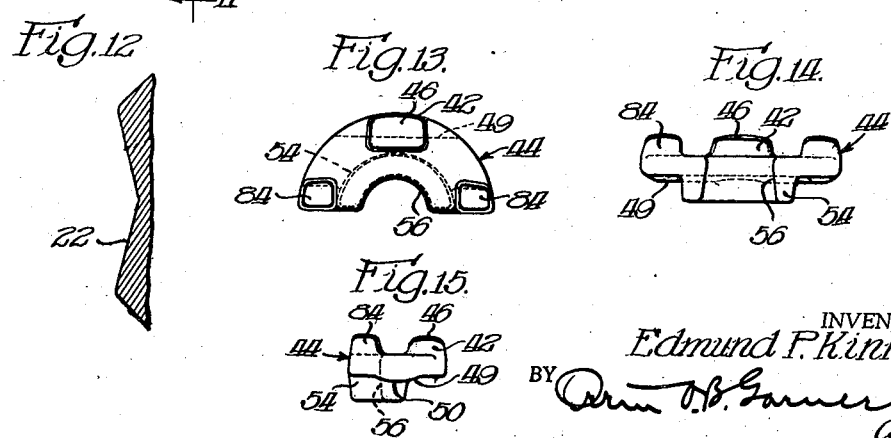
INVENTOR.
Edmund P. Kinne Oct. 17, 1944.  E. P. KINNE  2,360,566
DRAFT GEAR
Filed Sept. 15, 1941  3 Sheets-Sheet 3

INVENTOR.
Edmund P. Kinne
BY
Atty.

Patented Oct. 17, 1944

2,360,566

UNITED STATES PATENT OFFICE 2,360,566

DRAFT GEAR

Edmund P. Kinne, Alliance, Ohio, assignor to American Steel Foundries, Chicago, Ill., a corporation of New Jersey Application September 15, 1941, Serial No. 410,835

30 Claims. (Cl. 213—32)

My invention relates to draft gears and particularly to a general type of gear commonly called the barrel type utilizing clutch means at the open end of the barrel, and a compression spring at the closed end thereof.

The general object of my invention is to devise an improved form of clutch type draft mechanism wherein a plurality of wedge inserts or intermediate wedges operate in conjunction with friction shoes, a wedge follower, resilient means, and the housing to provide adequate capacity and positive release.

A different object of my invention is to so arrange the wedge inserts and the wedge follower that said inserts and follower may operate substantially as a single wedge unit in the closing stroke in order to give the required capacity.

Another object of my invention is to devise a draft mechanism such as that referred to wherein the forces of impact are transmitted directly to the follower wedge, thence through the wedge inserts to the shoes and housing and resilient means, while the forces of release are transmitted from resilient means in the housing to the shoes and thence to the inserts in such manner as to place a turning moment on each wedge insert in order to break the frictional contact and secure a free and positive release.

Yet another object of my invention is to devise a clutch type draft gear wherein wedge inserts are associated with respective friction shoes and wherein each wedge insert is interlocked with an adjacent insert in order to maintain proper alignment therebetween.

My invention also contemplates such an arrangement as that just described wherein a ball and socket joint is afforded between each wedge insert and an adjacent wedge insert, thus permitting each insert relative freedom of movement for alignment with respect to the follower and its associated friction shoe, while, at the same time, permitting all of the inserts to be in some degree interlocked. In this manner my novel arrangement comprehends a wedge insert assembly of somewhat flexible form which, when properly assembled, is self-supporting in normal position between the follower and the friction shoes.

An additional object of my invention is an arrangement of wedge follower and wedge inserts which act as a single wedge unit in the closing stroke, said wedge follower and wedge inserts having angular wedging contact therebetween, such wedging angle being appreciably less than the wedging angle between the wedging inserts and the friction shoes which is active in the closing stroke, thus providing free release of all the parts upon the return of the gear to open position and thus preventing sticking action.

Still another object is to provide an arrangement whereby the elasticity of the barrel is utilized to assist in breaking the contact between the various parts in order to facilitate release action and prevent sticking.

In one embodiment, my novel clutch arrangement may be applied to a four shoe gear wherein the friction shoes are substantially identical and may be disposed in pairs arranged along axes substantially at right angles to each other within the friction housing.

My novel draft mechanism also contemplates a further embodiment wherein equalizing means my be interposed between the friction shoes and the resilient means in such manner as to permit each friction shoe to assume a position where it will be tightly fitted between said resilient means and the associated wedge means in some degree independently of the other friction shoes. In other words, the equalizing mechanism may rock to a certain degree in order to permit the resilient means to bear substantially equally against each of the friction shoes.

In the drawings, Figure 1 is an end view of a draft gear embodying my invention, the view being taken at the open end of the housing with the follower wedge and securing bolt removed in order more clearly to illustrate the parts therewithin.

Figures 3 and 4 show my novel form of follower wedge, Figure 3 being a plan view thereof from the shoe engaging face, and Figure 4 a side elevation, half in section, the section being taken substantially in the plane indicated by the line 4—4 of Figure 3.

Figures 5, 6, 7, and 8 show my novel form of wedge insert, Figure 5 being a plan view taken from the follower engaging side thereof, Figure 6 a side elevation, and Figure 7 a further plan view taken from the top side with the insert in normal position, and Figure 8 a fragmentary sectional view substantially in the diagonal plane indicated by the line 8—8 of Figure 6.

Figure 1:
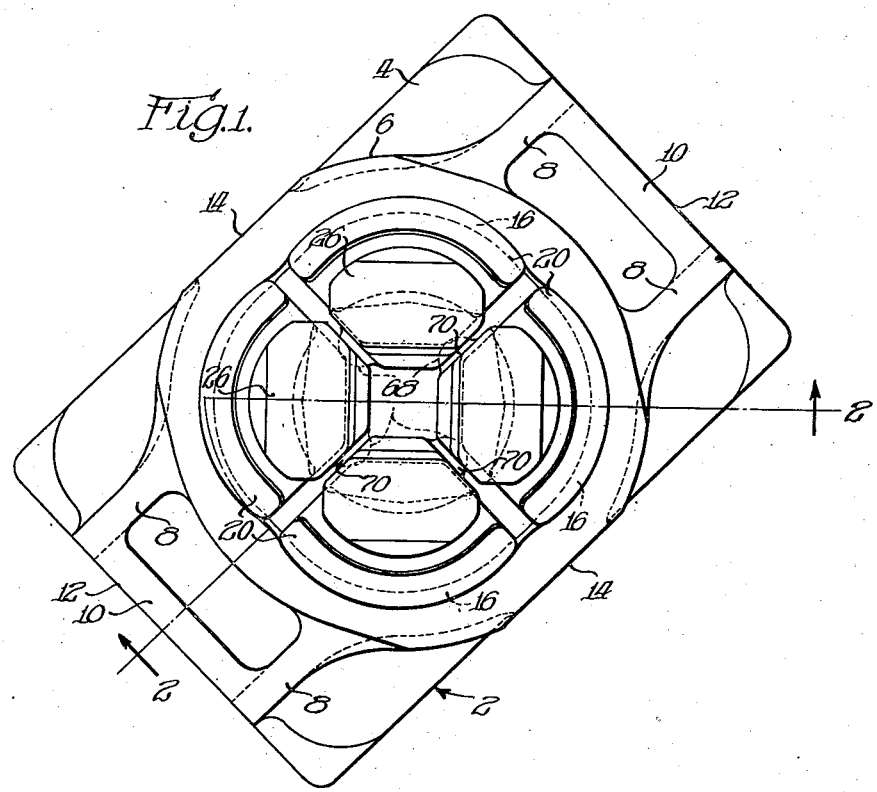
Figure 2:
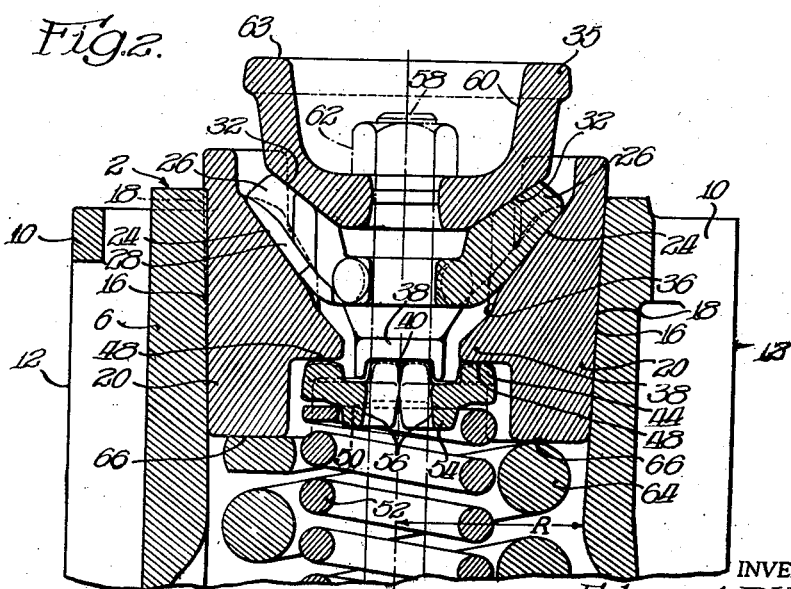
Figure 2 is a sectional view through the draft gear shown in Figure 1, the section being taken in a plane substantially as indicated by the line 2—2 of Figure 1 with the insert wedge at one side of the gear shown in elevation.

Figures 9, 10, 11, and 12 illustrate my novel form of friction shoe as illustrated in the embodiment of Figures 1 and 2, Figure 9 being a side elevation from the insert engaging face thereof, Figure 10 a top plan, Figure 11 a section through the center of the shoe substantially in the vertical plane indicated by the line 11—11 of Figure 9, and Figure 12 a fragmentary sectional view taken substantially in the diagonal plane indicated by the line 12—12 of Figure 11.

Figures 13, 14, and 15 illustrate my novel form of equalizer member, Figure 13 being a top plan view thereof, Figure 14 a side elevation taken from the bottom as seen in Figure 13, and Figure 15 an end view taken from the right as seen in Figure 14.

Figure 16:
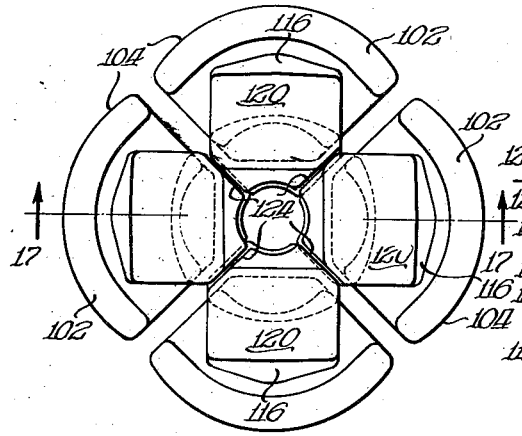
Figure 17:
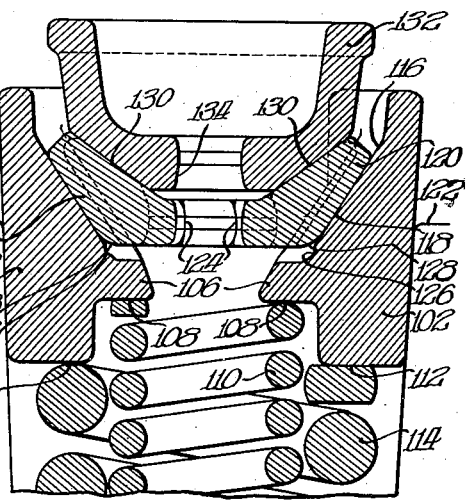

Figures 16 and 17 illustrate another modification of my invention wherein the insert members are interlocked with each other in different manner, Figure 16 being an end view of the clutch assembly in normal position taken from the open end of the housing with the housing omitted, and Figure 17 being a sectional view through the clutch mechanism shown in Figure 16, taken substantially in the plane indicated by the line 17—17 of Figure 16.

Figure 18:
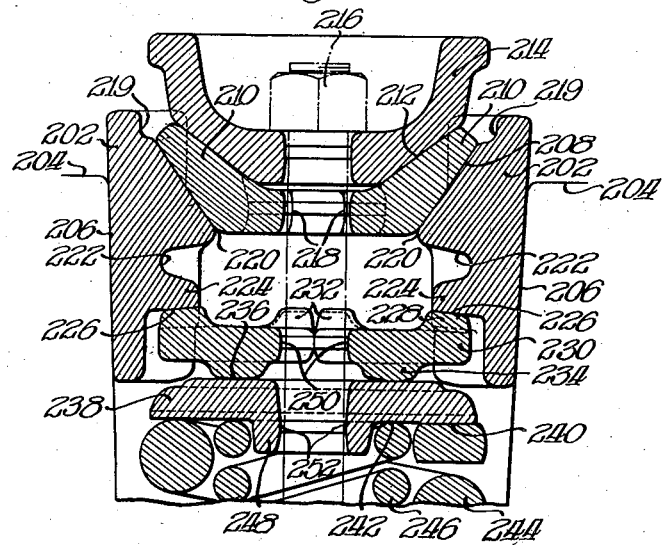

Figure 18 illustrates a still further embodiment of my invention utilizing inserts interlocked as in the embodiment illustrated in Figures 16 and 17 and employing an equalizer arrangement differing in some respects from the embodiment illustrated in Figures 1 and 2.

Referring first to the modification shown in Figures 1 and 2, it will be noted that my novel draft gear comprises a barrel type housing of usual form generally designated 2, said housing comprising a base 4 of generally rectangular form, and a barrel portion 6 of cylindrical form, the housing structure being reinforced by spaced longitudinal flanges 8, 8 at each side thereof, said flanges being joined adjacent the open end of the housing by the integrally formed strap 10. The parallel outer edges of said flanges, together with said base 4, may afford seats as at 12, 12 for said draft gear when the housing is positioned with the surfaces 12, 12 horizontal, and other seats being afforded as at 14, 14 by the other opposite edges of said base together with the flattened sides of the housing. Adjacent the open end of the housing may be formed four symmetrically arranged arcuate tapering friction surfaces designated 16, 16 and in frictional engagement therewith as at 18, 18 may be the complementary friction surfaces 19, 19 (Figure 11) of the friction shoes 20, 20, said shoes being disposed in pairs arranged along axes approximately at right angles to each other and symmetrically disposed around said housing. The friction surface of each shoe at 18 is formed on a radius considerably shorter than the radius "R" (Figure 2) from the center of the housing to the inner edge of the housing friction surface 16, so that the shoes will not rotate in the housing, and each friction shoe is formed with a V-shaped inner face 22 (Figure 12) against which may seat as at 24 a wedge-like insert 26, said insert having a V-shaped surface 28 (Figure 8) complementary in form to the surface 22 so that each insert is prevented from rotating with respect to the associated friction shoe. Each insert 26 has formed on its outer face a flat diagonally arranged surface 30 which may engage as at 32 with the adjacent flat surface 34 on the follower wedge 35, said surface 34 being arranged at an angle complementary to the surface 30 on the adjacent insert.

Each shoe 20 may be relieved as at 36 inwardly of the V-shaped surface 22 in order to afford clearance from the inner end of the associated insert member 26, and immediately below the relief 36 may be formed with a shelf 38, slotted as at 40 on its inner surface for reception of an upwardly projecting central bearer 42 (Figure 13) on the adjacent equalizer 44, said bearer 42 being of tapering form with rounded edges and crowned on the top surface thereof as at 46 for abutment as at 48 (Figure 2) against said beforementioned shelf portion 38. Extending across the inner face of each equalizer member 44 centrally thereof may be a crowned or elevated portion 49 (Figure 15) affording a rocking seat 50 for said equalizer on the auxiliary compression spring 52, and each equalizer 44 may have a semi-annular reinforcing flange 54 with an inner wall tapering as at 56 and formed with smooth radii at its upper and lower edges in order to accommodate rocking relationship of said equalizer with respect to the securing bolt 58 of usual form, the threaded end of said bolt being housed within the cup-like cavity 60 formed on the outer face of the wedge follower 35 and fixed therein by the threaded nut 62. The outer annular surface 63 of the follower 35 may afford a seat for one end of the gear and the base 4 of the housing form a seat for the opposite end thereof.

Concentrically arranged therewith and surrounding the auxiliary compression spring 52 is the main compression spring 64, the outer end of which may seat as at 66, 66 against the inner ends of the respective friction shoes 20, 20.

Each wedge insert 26 is afforded a ball and socket joint with wedge inserts at opposite sides thereof, said ball and socket joints being indicated respectively at 68, 68 (Figure 1) and serving as a means of tying together said wedge inserts and preventing undue play thereof with respect to each other and with respect to the associated shoes. When assembled in proper position therefor, the projecting arcuate lug or ball 70 (Figure 7) of each wedge insert is housed within the socket 72 formed on the adjacent insert adjacent the lower edge thereof so that said ball and socket joints at 68, 68 afford fulcrums adjacent the inner ends of the respective wedge inserts so that each of said wedge inserts may fulcrum thereabout in a manner to be hereafter more fully described.

It may be noted that the use of the intermediate wedges or wedge inserts disposed between the follower wedge and the respective shoes makes it possible to utilize a wedging angle much steeper than the release angle. In other words, the releasing angle, which is the area along which the intermediate wedge engages the follower, is much flatter than the active friction angle or wedging angle, which is the surface between the intermediate wedge and the shoe. This permits the use of any desired wedging angle while at the same time facilitating free release.

My novel form of wedge follower is shown in detail in Figures 3 and 4 and is a cup-like structure having the cavity 60 on its outer face for the purpose already described, the diagonally arranged friction surfaces 34, 34 symmetrically arranged about the inner sides thereof, and the centrally formed aperture 74 affording passageway for the before-mentioned securing bolt, the walls of said passageway being relieved top and bottom as at 76 and 78 to accommodate rocking motion of said wedge follower with respect to the securing bolt. As shown in the present modification, the follower 35 is somewhat rectangular in plan conforming to the open end of the housing within which it may be received.

The detail of the wedge insert is shown in Figures 5 to 8 inclusive wherein the respective parts thereof, heretofore referred to, are designated. The wedge insert is a solid body of metal of general V-shape in elevation, the upper portion of which may be formed at the top with the flat diagonally arranged follower engaging surface 30 and at the bottom with the V-shaped shoe engaging surface 28, and at its lower end may be tapered somewhat to provide clearance from the follower wedge and from the adjacent shoe and formed with the before-mentioned ball and socket portions 70 and 72 for the purpose already described.

My novel form of friction shoe is shown in detail in Figures 9, 10, 11, and 12 wherein it may be noted that each shoe is a solid body of metal with a tapering arcuate back wall affording the before-mentioned friction surface 19, said friction shoe having a relatively thick central portion reaching a maximum in the ledge 38 and on the top or outer surface of said shelf portion may be formed the before-mentioned diagonally arranged V-shaped follower engaging surface 22, said shoe being relieved as at 80 above said friction surface 22 and therebelow as at 36 as already mentioned, the relief at 36 permitting the before-mentioned fulcruming or rocking movement of the associated insert wedge 26. The slot 40, formed in the bottom of the shelf portion 38, affords a means of interlocking the shoe with the associated equalizing member, or members, as the case may be. The friction surface 19 at the back of each friction shoe may be interrupted centrally thereof by the flat surface 82 extending from the top to bottom of said shoe as clearly indicated in the view of Figure 9, thus facilitating seating of the shoe and permitting more prompt development of adequate seating area. The taper of the friction surface 19 at the back of each friction shoe is complementary to that of the adjacent friction surface 16 of the housing.

The equalizer utilized in this embodiment of my novel form of gear is shown in detail in Figures 13, 14, and 15. It will be understood that two equalizer members 44, 44, identical in form, are utilized in each gear, each equalizer member appearing in plan as a half-round plate, as best seen in the view of Figure 13, slotted as at 56 along the straight edge thereof for the purpose already described and having on its outer or upper face the before-mentioned intermediate bearer 42 having the general contour of a frustrum of a cone of somewhat rectangular section with the top surface crowned as at 46 to afford a seat against an adjacent shoe, said lug or bearer 42 having the corners and edges thereof formed with smooth radii to prevent stress localization. At the opposite extremities of each equalizer member 44 and also on the top or outer face thereof may be formed end bearers 84, 84 each of said end bearers being approximately half the size of the intermediate bearer 42 with a configuration such that two of said end bearers 84, 84 may be received within a single shoe slot 40 and have bearing against the shelf 38 thereof. Each end bearer 84, like each intermediate bearer 42, is of tapered form with an arcuate top surface to permit rocking with respect to the abutting shoes as already referred to. On the inner or bottom face of each equalizer member 44 and around the inner perimeter thereof may be formed a flange 54 defining in part the central slot 56 already referred to and positioning said equalizer member with respect to the abutting compression spring, and extending straight across said bottom surface longitudinally of the member 44 may be the crowned portion 49, said crowned portion being interrupted centrally thereof by said before-mentioned flange 54.

It will be apparent from the aforementioned description that each equalizer member 44 will be afforded a seat as at 50 at some intermediate area along the crowned portion 49 against the top surface of the auxiliary compression spring 52, the character of the engagement therewith permitting said equalizer to rock with respect to said spring. Also, each equalizer member is interlocked by means of the bearers 46 and 84 with a plurality of friction shoes, in this modification three of the four shoes utilized. The force of the compression spring applied to each equalizer member 44, therefore, will be distributed or equalized among three of the four friction shoes as illustrated in this embodiment.

In operation, application of a blow to the wedge follower will be distributed therefrom to the wedge inserts which will move and operate as a single element in the closing cycle of the stroke. In the closing operation the wedge follower 35 will move inwardly as will also the wedge inserts 26, 26, but said inserts will be prevented from moving radially inwardly by their ball and socket joints with each other about which they may fulcrum. Said wedge inserts therefore move inwardly in a group or as a unit, sliding as required along the upper surfaces thereof in abutment with the follower and along the bottom V-shaped surfaces thereof against the respective shoes until the end of the compression stroke is reached. At the end of the compression stroke the elastic properties of the housing as well as the compression spring will urge the shoes toward the axis of the gear and outwardly, and as the shoes bear against the inserts, a turning moment will be afforded thereby inasmuch as the bearing of each shoe against the adjacent insert is along the upper portion thereof, while the fulcrum of the insert is adjacent the lower or inner end thereof, and said turning moment will cause each insert member to rotate about the fulcrum at its inner or lower end and effect prompt release of the gear. The turning moment, applied to each wedge insert member, effects a momentary break between the friction wedging surfaces and the gear therefore has free release. Sticking of the wedge inserts after closure is prevented because the fulcrum point or pivot point of each insert is well below the line of force which is applied thereto by the adjacent friction shoe. By virtue of this free release feature, it is possible for me to make a steeper wedge angle and therefore develop greater friction without the resultant sticking action so often encountered in clutch type gears.

In the embodiment illustrated in Figures 16 and 17 I have shown a gear generally similar to that just described except for the omission of the equalizing feature which affords abutment between the compression spring and the friction shoe. In Figure 16 the follower wedge is omitted in order more clearly to illustrate the relationship of the parts therewithin. In the modification of Figures 16 and 17 the clutch mechanism only is illustrated and may consist of a plurality of symmetrically arranged shoes 102, 102 having arcuate tapering friction surfaces 104, 104 for frictional engagement with complementary surfaces on a housing such as that described for the previous modification. Each shoe 102 may have a relatively thick central portion with the inwardly projecting shelf 106 affording a seat as at 108 for the auxiliary compression spring 110, and each shoe 102 may have at its lower extremity, flat face engagement as at 112 with the upper end of the main compression spring 114. On the top of each shelf-like portion 106 of each shoe may be formed a V-shaped friction surface 116 having engagement as at 118 with a complementary face formed on the adjacent wedge insert 120. The relative position of the friction shoes 102, 102 within the housing may be indicated at 122, 122 at opposite sides of Figure 17.

Each wedge insert 120 is somewhat similar in form to the wedge insert of the previous modification except that instead of ball and socket joints connecting adjacent inserts I have provided interengaging fulcrum means as at 124, 124 consisting of a concave face along the lower inner edge at one side of each insert for reception of a convex generally complementary portion on the adjacent insert so that the adjacent inserts may fulcrum against each other in manner somewhat similar to that of the previous modification. In this modification also each shoe may be relieved as at 126 along the lower portion of the friction surface 116 and each insert member relieved as at 128 in order to accommodate a fulcruming action similar to that described for the previous modification.

The upper or outer face of each wedge insert 120 may be afforded a flat face for engagement as at 130 with a complementarily arranged flat diagonal face on the wedge follower 132, said wedge follower being a cup-like structure generally similar to that of the previous modification with the central aperture 134 for reception of a securing bolt.

The modification illustrated in Figure 18 embodies certain features common to both the modifications previously described and includes friction shoes 202, 202 symmetrically arranged about a friction housing (not shown), the position of said shoes within said housing being indicated at 204, 204 at opposite sides of Figure 18. The shoes 202, 202 may be received within a housing generally similar to that of the modifications previously described and have tapering arcuate friction face engagement thereagainst as at 206, 206 and each friction shoe 202 may be formed with a V-shaped surface on its upper or outer face having abutment as at 208 with the complementary surface on the adjacent wedge insert 210, and each wedge insert may have flat engagement on its outer face as at 212 against a complementary diagonal surface afforded on the wedge follower 214 which may house the securing bolt 216 in manner similar to that described for the previous modification. The wedge inserts 210, 210 may interlock with and fulcrum against each other as at 218, 218 in manner substantially identical to that illustrated in Figures 16 and 17. In the modification of Figure 18, however, each friction shoe 202 is relieved adjacent the upper end of the wedge insert 210 as at 219 and adjacent the lower end thereof as at 220 in order to facilitate the fulcruming action of the wedge insert similar to that described for the previous modifications. In order to reduce weight, each shoe 202 may be afforded a central cavity 222 on the inner face thereof and below said cavity a shelf-like portion 224 may be formed with a diagonally arranged flat bottom surface affording a seat as at 226 for the elevated bearer 228 formed on the top surface of the equalizer member 230. It will be understood that each equalizer member 230 is formed generally similar to the equalizer illustrated in Figures 13 to 15 with end bearers 232, 232 as well as an intermediate bearer 228 on the upper or outer surface thereof as well as a centrally positioned bottom bearer 234. In this modification the bearer 234 does not extend for the length of the equalizer 230 but is centrally positioned on the inner face thereof. Each bearer 234 may have arcuate face engagement as at 236 atop the spring cap 238, and said cap 238 may seat as at 240 and 242 against the main compression spring 244 and the auxiliary compression spring 246 respectively, said cap 238 having an inwardly directed flange 248 on its inner perimeter serving as positioning means for said spring cap with respect to said springs. Each equalizer member 230 may be relieved as at 250 and the spring cap may be afforded the central opening 252 to accommodate the beforementioned securing bolt 216.

The operation of this modification is similar to that of the previous modifications in that the wedge inserts 210, 210 may operate as a unit in the compression stroke, being positioned to fulcrum against each other at their inner lower edges, so preventing movement thereof radially inwardly, while at the same time permitting said wedge inserts to fulcrum about their abutting surfaces as described for the previous modifications to effect a free release.

In the modification of Figure 18, the diagonal face engagement of each equalizer top bearer against the adjacent friction shoes is distinctive and the utilization of the spring cap 238 permits the forces from the compression springs to be concentrated against the respective bearers 234, 234 on the bottoms of the equalizer members 230, 230 centrally thereof.

Each modification of my novel form of draft gear is alike and distinctive in its utilization of a wedge insert unit comprising a plurality of similar parts fulcrumed against each other and functioning substantially as a unit on the compression stroke of the gear, while at the same time effecting a free release thereof at the end of the compression stroke.

It is to be understood that I do not wish to be limited by the exact embodiments of the device shown which are merely by way of illustration and not limitation as various and other forms of the device will, of course, be apparent to those skilled in the art without departing from the spirit of the invention or the scope of the claims.

I claim:

1. In a draft gear, a housing having an open end with friction surfaces therearound, a compression spring, and clutch mechanism comprising friction shoes supported on said spring and seated against said surfaces respectively, a follower, and wedge inserts between said follower and the respective shoes, each of said inserts being afforded fulcruming means against adjacent inserts, each of said fulcruming means comprising ball and socket connections of each insert with the adjacent inserts, said ball and socket connections being formed adjacent the inner ends of said inserts axially inwardly of the follower and shoe engaging surfaces of said inserts.

2. In a draft gear, a barrel having an open end with friction surfaces therearound, spring means housed therein, and clutch mechanism comprising friction shoes seated against said respective surfaces, a follower, wedge inserts in engagement with the respective shoes and in abutment with said follower, interengaging fulcrum means on said inserts at their adjacent inner ends, and equalizer means interposed between certain of said spring means and said shoes, said equalizer means comprising a plurality of members seated on certain of said spring means for rocking engagement therewith, and each of said members having a central bearer engaging one of said shoes, and end bearers engaging adjacent shoes.

3. In a draft gear, a barrel having an open end with friction surfaces therearound, spring means therein, and clutch mechanism comprising friction shoes seated against said surfaces respectively, a follower, wedge inserts in wedge engagement with respective shoes and said follower, interlocking means on said wedge inserts permitting each of said inserts to fulcrum against adjacent inserts, equalizer means interposed between certain of said spring means and said shoes, said equalizer means comprising a plurality of fulcruming members, each of said members having a central bearer against one of said shoes, and end bearers abutting adjacent shoes.

4. In a draft gear, a barrel having an open end with friction surfaces therearound, spring means housed therein, and clutch mechanism comprising friction shoes seated against said respective surfaces, a follower, wedge inserts in engagement with the respective shoes and in abutment with said follower, interengaging fulcrum means on said inserts at their adjacent inner ends, and equalizer means interposed between certain of said spring means and said shoes, said equalizer means comprising a plurality of members seated on certain of said spring means for rocking engagement therewith, said fulcrum means affording relative turning movement between adjacent insert members.

5. In a draft gear, a housing with an internal friction surface, friction shoes engaged therewith, shelves on said shoes projecting radially inwardly toward the longitudinal axis of said gear, wedge inserts in complementary wedge engagement with said shelves, an outer follower in complementary wedge engagement with said inserts, said inserts being afforded ball and socket connections with each other at their inner extremities and being spaced from each other outwardly of said extremities, spring means reacting against said shelves for resisting movement of said shoes into said housing, said inner extremities of said inserts being spaced axially outwardly of the inner extremities of said shelves and being spaced from said spring means, and a retainer bolt extending between said shoes and between said inserts, said bolt being slidably interlocked with said outer follower.

6. In a draft gear, a housing having an internal friction surface, friction shoes engaged therewith, each of said shoes comprising a shelf projecting radially inwardly toward the longitudinal axis of the gear, a wedge insert engaged with a complementary wedge surface on each shelf, said inserts being pivotally engaged at their inner ends, an outer wedge follower engaging said inserts, an equalizer comprising a plurality of members rockably seated against said shelves adjacent their radially inner extremities, and a compression spring within said housing bearing against said members.

7. In a draft gear, a housing having an internal friction surface, friction shoes engaged therewith, each of said shoes comprising a shelf projecting radially inwardly toward the longitudinal axis of the gear, a wedge insert engaged with a complementary wedge surface on each shelf, fulcrum means at opposite edges of each insert at the inner extremity thereof for cooperation with complementary means on the edges of the adjacent inserts, an outer wedge follower engaging said inserts, an equalizer comprising a plurality of members rockably seated against said shelves adjacent their radially inner extremities, and a compression spring within said housing bearing against said members.

8. In a draft gear, a housing having an internal friction surface, friction shoes engaged therewith, each of said shoes comprising a shelf projecting radially inwardly toward the longitudinal axis of the gear, a wedge insert engaged with each shelf, said inserts being pivotally interengaged at their inner extremities only, an outer wedge follower engaging said inserts, equalizer means seated against said shelves adjacent their radially inner extremities, and a compression spring within said housing bearing against said equalizer means, and retainer means extending between said shoes and between said inserts, said retainer means being connected to said outer follower for limiting outward movement thereof with respect to said housing.

9. In a draft gear, a housing having an internal friction surface, friction shoes engaged therewith, each of said shoes comprising a shelf projecting radially inwardly toward the longitudinal axis of the gear, a wedge insert engaged with each shelf, said inserts being pivotally interengaged at their inner extremities only, outer wedge means engaging said inserts, spring means reacting against said housing and against said shelves adjacent their radially inner extremities for resisting movement of said shoes into said housing, said inserts being spaced from said spring means, and retainer means extending between said shoes and between said inserts, said retainer means being slidably interlocked with said outer wedge means.

10. In a wedge insert for a draft gear, a substantially solid member having follower and shoe engaging surfaces at opposite sides thereof and converging toward one end thereof, a projection on the opposite end of said member disposed longitudinally beyond said surfaces, and means at opposite edges of said projection for pivotal engagement with associated members forming a unit therewith.

11. In a draft gear, a housing having an open end with friction surfaces therearound, main and auxiliary compression springs, and clutch mechanism comprising friction shoes supported on said springs and seated against said surfaces respectively and abutting said main and auxiliary springs in spaced planes, a follower, and wedge inserts engaging said follower and the respective shoes, said inserts being pivotally interlocked with each other, and each of said inserts being afforded a fulcruming abutment at the inner end thereof with adjacent inserts, said shoes being relieved to accommodate fulcruming action of said inserts with respect to each other during release of the gear.

12. In a wedge unit for a draft gear, a plurality of wedge members having follower and shoe engaging surfaces on opposite sides thereof, projections on corresponding ends of said members disposed longitudinally beyond said surfaces, and interengaging fulcrum means at opposite edges of said projections affording pivotal movement between said member.

13. In a wedge assembly for a draft gear, a plurality of members tapering toward the adjacent ends thereof and having follower and shoe engaging surfaces at opposite sides thereof, and complementary interengaging ball and socket means on opposite edges of said members at said adjacent ends only thereof.

14. In a draft gear, a barrel having an open end with friction surfaces therearound, spring means therein, and clutch mechanism comprising friction shoes supported on said means and seated against said surfaces respectively, a follower, wedge inserts in engagement with respective shoes and said follower, interlocking means on said wedge inserts axially inwardly of the follower and shoe engaging surfaces thereof, said interlocking means permitting each of said inserts to pivotally fulcrum against adjacent inserts, a spring cap on said spring means, and equalizer means interposed between said spring cap and said shoes.

15. In a draft gear, a housing having an open friction end with an internal friction surface, a compression spring, and a clutch mechanism comprising friction shoes supported on said spring in frictional engagement with said surface, a follower, and a wedge unit between and engaged with said follower and said shoes, said unit comprising a plurality of insert members tapered toward the inner ends thereof to afford clearance from each other, and spaced pivotal connections at the inner end of each insert member at opposite edges thereof with adjacent insert members, the follower and shoe engaging surfaces of each insert member lying in planes converging toward the outer end thereof.

16. In a draft gear, a housing having an open end with an internal friction surface, friction shoes engaged therewith, resilient means in said housing bearing against said shoes, an outer follower, wedge inserts between and engaged with said follower and respective shoes, said wedge inserts being tapered toward the inner ends thereof to afford clearance from each other, and spaced interengaging means at the inner end of each insert at opposite edges thereof cooperating with complementary means of the adjacent inserts for preventing relative movement therebetween longitudinally of the gear and accommodating relative turning movement therebetween.

17. In a draft gear, a housing having an open end with an internal friction surface, friction shoes engaged therewith, resilient means in said housing bearing against said shoes, an outer follower, wedge inserts between and engaged with said follower and respective shoes, said wedge inserts being tapered toward the inner ends thereof to afford clearance from each other, spaced interengaging means at the inner end of each insert at opposite edges thereof cooperating with complementary means of the adjacent inserts for preventing relative movement therebetween longitudinally of the gear and accommodating relative turning movement therebetween on axes substantially at right angles to the longitudinal axis of the gear, and a bolt and nut assembly extending between said inserts and said shoes, said assembly being slidably interlocked with said outer follower for retaining the draft gear in assembled relationship.

18. In a draft gear, a housing having an open friction end with an internal friction surface, friction shoes engaged with said surface, resilient means in said housing bearing against said shoes, an outer wedge follower, and a wedge assembly comprising a plurality of elements frictionally engaging said follower and respective shoes, said elements being radially movable with respect to the longitudinal axis of the gear whereby the engagement between said elements and said shoes is momentarily terminated during release of the gear, each of said elements having spherical surfaces at opposite edges of the inner extremity only thereof engaged with complementary spherical surfaces of the adjacent elements, and retainer means extending between said shoes and said elements, said retainer means being slidably interlocked with said outer wedge follower.

19. In a draft gear, a housing having an open friction end with an internal friction surface, a compression spring, and a clutch mechanism comprising friction shoes supported on said spring in engagement with said surface, a follower, and wedge inserts between and engaged with said follower and the respective shoes, means pivotally connecting each of said inserts at the inner end thereof to the inner ends of the adjacent inserts, said connecting means being disposed radially outwardly and spaced from the longitudinal axis of the gear.

20. In a wedge insert for a draft gear, a substantially solid metallic member having follower and shoe engaging surfaces at opposite sides thereof, and a complementary ball and socket at opposite edges of said member at one end thereof for pivotal interlocking with associated inserts.

21. In a draft gear, a housing, spring means therein, friction members supported on said means in engagement with said housing, follower means, and a plurality of insert members abutting said follower means and in engagement with respective friction members, each of said insert members being pivotally interengaged at opposite edges thereof with the adjacent insert members, the interengagement of said insert members being axially inwardly of the surfaces thereon engaging said friction members and said follower means.

22. In a draft gear, a housing, spring means therein, follower means, friction means supported on said spring means in engagement with said housing, a plurality of insert means between said follower means and said friction means and in engagement therewith, each of said insert means being pivotally interconnected at opposite edges thereof with the adjacent insert means, and a retaining bolt and nut assembly extending between said insert means and slidably interlocked with said follower means, the interconnection of said insert means being at the inner ends thereof and axially inwardly of the surfaces thereon engaging said follower and friction means.

23. In a draft gear, a housing, two pairs of friction members therein and in engagement therewith, a follower, two pairs of insert members in abutment with said follower and in engagement with respective friction members, said insert members being tapered toward the inner ends thereof to afford clearance therebetween, and resilient means in said housing bearing against said friction members, fulcrum means at the opposite lateral edges of each insert member of one pair engaging complementary means on respective insert members of the other pair, said friction members exerting pressure against respective insert members during release of said gear, whereby relative turning movement between said insert members is afforded, the interengagement of said insert members being axially inward of the surfaces thereon engaging said follower and friction members.

24. In a draft gear, a housing, a plurality of friction shoes within said housing and frictionally engaged therewith, a follower, a plurality of inserts in wedge engagement with said shoes respectively and in wedge engagement with said follower, said inserts being pivoted at the inner ends thereof, and spring means within said housing for resisting inward movement of said shoes and inserts, said inserts being spaced at all times from said spring means and being maintained in assembled relationship solely by their engagement with each other and with said shoes and follower.

25. In a draft gear, a housing, spring means therein, friction members supported on said means in engagement with said housing, follower means, and insert members abutting said follower means and in engagement with respective friction members, each of said insert members having a complementary spherical ball and socket at opposite edges thereof and at the inner extremity only thereof for pivotal interlocking with the adjacent insert members.

26. In a draft gear, a housing, spring means therein, follower means, friction members supported on said spring means and in engagement with said housing, and insert members between said follower means and said friction members and in engagement therewith, said insert members being tapered toward the inner ends thereof to afford clearance therebetween, and a ball and socket connection between the lateral edges of adjacent insert members, at the inner ends thereof and axially inwardly of the surfaces thereon engaging said friction members and said follower means.

27. In a draft gear, a housing, spring means therein, friction members supported on said means in engagement with said housing, follower means, and insert members abutting said follower means and in engagement with respective friction members, said insert members being tapered toward the inner ends thereof to accommodate relative turning movement with respect ot each other and said insert members having engaging means comprising fulcrum means at opposite edges of each insert member engaging complementary means on the adjacent edges of the insert members at opposite sides thereof, said fulcrum means being disposed at the inner ends of said insert members to afford said turning movement and to prevent relative movement therebetween longitudinally of the gear.

28. In a draft gear, a housing, spring means therein, follower means, friction shoes supported on said spring means in engagement with said housing, and interconnected insert members between said follower means aid said friction shoes and in engagement therewith, and retaining means extending between said insert members and said shoes and slidably interlocked with said follower means, said insert members being formed and arranged to permit relative turning movement therebetween, and said shoes being relieved to accommodate said relative turning movement.

29. In a wedge insert for a draft gear, a substantially solid metallic member tapering toward one end thereof and having follower and shoe engaging surfaces at opposite sides thereof, and a complementary ball and socket at opposite edges of said member at said end for pivotal interlocking with associated inserts.

30. In a wedge insert for a draft gear, a substantially solid metallic member having follower and shoe engaging surfaces at opposite sides thereof, and a projection on one end thereof disposed longitudinally beyond said surfaces, and means at opposite edges of said projection for pivotal engagement with associated members forming a unit therewith.

EDMUND P. KINNE.